United States Patent [19]

Plow

[11] Patent Number: 4,693,128
[45] Date of Patent: Sep. 15, 1987

[54] APPARATUS FOR CONVERTING LINEAR MOTION TO ROTARY MOTION

[75] Inventor: Arthur E. Plow, Ponchatoula, La.
[73] Assignee: T K Valve & Manufacturing, Inc., Hammond, La.
[21] Appl. No.: 851,882
[22] Filed: Apr. 11, 1986

Related U.S. Application Data

[63] Continuation of Ser. No. 663,316, Oct. 22, 1984, abandoned.

[51] Int. Cl.⁴ .................. F16H 25/24; F16H 21/44
[52] U.S. Cl. .................. 74/104; 74/89.15; 74/424.8 R; 74/424.8 VA
[58] Field of Search .............. 74/104, 107, 89.15, 74/424.8 R, 424.8 VA

[56] References Cited

U.S. PATENT DOCUMENTS

| | | | |
|---|---|---|---|
| 1,511,049 | 10/1924 | Cederquist | 74/424.8 R |
| 2,712,242 | 7/1955 | Davis | 74/104 |
| 3,385,120 | 5/1968 | Nott | 74/104 |
| 3,874,245 | 4/1974 | Kral et al. | 74/89.15 |
| 4,005,614 | 2/1977 | Moore et al. | 74/104 |
| 4,075,899 | 2/1978 | Bartholomew et al. | 74/107 |
| 4,265,132 | 5/1981 | Robertson | 74/104 |
| 4,354,396 | 10/1982 | Charles | 74/104 |
| 4,355,566 | 10/1982 | Kaji | 74/104 |

*Primary Examiner*—Allan D. Herrmann
*Attorney, Agent, or Firm*—Head, Johnson & Stevenson

[57] ABSTRACT

This is a system of providing lateral support to the block of a Scotch Yoke mechanism. The Scotch Yoke mechanism is useful in operators or devices which translate linear motion to rotary motion. The Scotch Yoke has a hub with an upper U-shaped member having two arms and a lower U-shaped member also having two arms. The hub is connected to a rod so that rotation of the hub rotates the rod. A drive screw or rod is between the upper and lower U-shaped arms and is provided with a block which has upper and lower rollers for engaging the Scotch Yoke assembly which is mounted in a housing. This whole mechanism may be called an operator. A new and improved way is provided for transmitting applied force which is imposed on the block to the housing proper.

10 Claims, 13 Drawing Figures

U.S. Patent  Sep. 15, 1987  Sheet 1 of 6  4,693,128
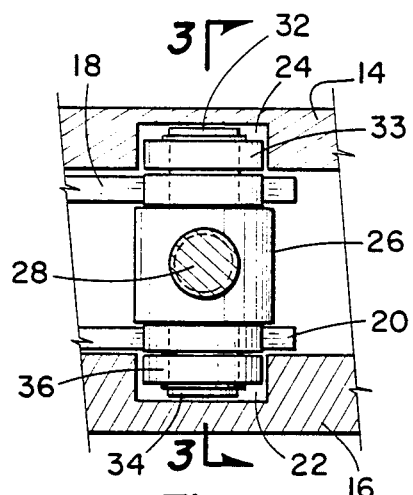
Fig. 2
(CONVENTIONAL)
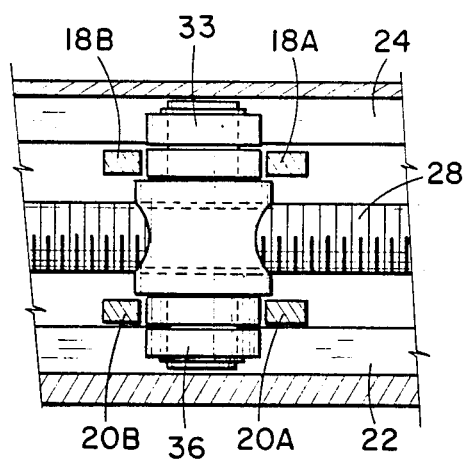
Fig. 3
(CONVENTIONAL)

APPARATUS FOR CONVERTING LINEAR MOTION TO ROTARY MOTION

This is a continuation of co-pending application Ser. No. 663,316 filed on Oct. 22, 1984, now abandoned.

BACKGROUND OF THE INVENTION

This invention is in the field of providing a lateral support to the drive nut of a Scotch Yoke mechanism. A Scotch Yoke mechanism is a means for converting the linear motion of a drive nut into rotational motion.

This relates to a means of providing lateral support to the drive nut of Scotch Yoke mechanism and especially to the "operator" as shown in T K Valve & Manufacturing, Inc., brochure 1982, whose address is P. 0. Drawer 2948, Hammond, La. 70404. That operator or assembly has two vertically spaced apart U-shaped arms mounted on a hub. An externally driven screw extends between the upper arms and the lower arms to move a drive nut which is provided between the two arms. The drive nut has an upper and lower extending cylindrical member. The upper and lower cylindrical members are each provided with two adjacent cylinder-like roller bearings which the two inner rollers contact the arms. The upper roller contacts and is in a groove in the upper cap or top of the housing and the lower roller contacts and is in a groove in the bottom of the housing.

SUMMARY OF THE INVENTION

This is a new method and apparatus for providing lateral support to the block of a Scotch Yoke mechanism which is used in an operator to transfer linear motion of a drive nut into rotational motion. This includes a hub assembly having a hub with a set of upper arms and a matching aligned pair of lower arms. The upper arms and the lower arms each take on a U-shape appearance to have an upper arm slot between each of the upper arms and a lower arm slot between each of the lower arms. There is a vertical displacement between the upper and lower arms and it is through this vertical space between the arms that a drive screw is mounted which extends externally of a housing which covers the entire hub assembly. A drive nut is provided for the screw and has an upper and lower cylindrical bolt-like member. An upper roller is retained on the upper member and a lower roller on the lower member. The upper roller is spaced in the slot between the upper arms and the lower roller is placed in the slot between the lower arms. Each roller has a diameter slightly less than the width of the slot. A housing encloses the Scotch Yoke and associated parts. The whole assembly can be called an operator. The drive screw can be rotated by turning a handle outside of the housing.

A rib is attached to or made a part of the housing and extends between the upper arms and the lower arms and extends essentially the length of that part of the screw which is inside the housing. A vertically extending slot is provided in the rib and is known as a rib slot. It is in this rib slot that the drive nut is placed. The opposite sides of the drive nut contact the walls of this rib slot and absorbs the lateral force exerted on the drive screw. This prevents deformation of the screw. The rib slot can be machined from the rib which can be cast with the housing.

The hub of the hub assembly is attached to a rod or bolt which extends externally of the housing of the operator and is used to rotate whatever might be desired to be rotated by the movement of the hub assembly. Quite frequently, this is used to open and close ball type valves.

Various objects and a better understanding of the invention can be had from the following description taken in conjunction with the drawings.

BRIEF DESCRIPTION OF THE DRAWINGS

FIG. 2 illustrates the thrust transfer system of the conventional Scotch Yoke.

FIG. 3 is a view taken along the line 3—3 of FIG. 2.

DETAILED DESCRIPTION OF THE PREFERRED EMBODIMENT

Figure 1:
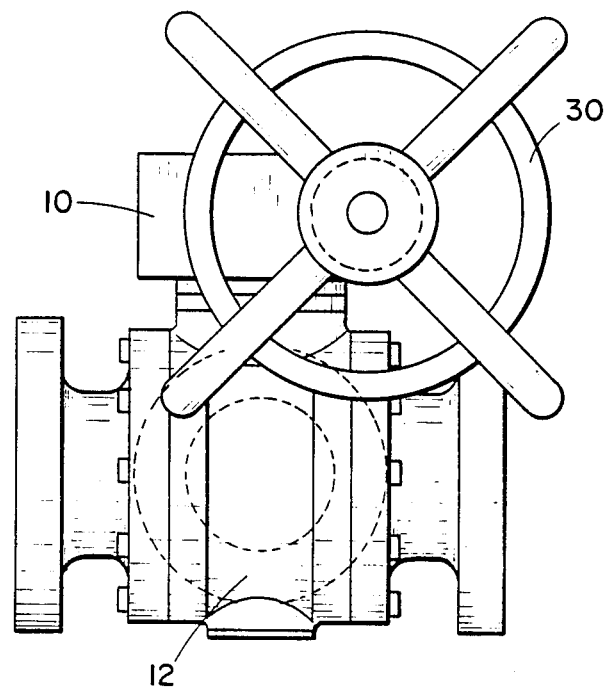
FIG. 1 illustrates an operator and a ball type valve to be turned by the operator.

Attention is first directed to FIG. 1 which shows an operator 10 mounted on top of a valve 12. This illustrates a conventional operator which uses a Scotch Yoke mechanism to convert linear motion into rotary motion as will be explained in conjunction with FIGS. 2 and 3. The operator has a housing as shown in FIGS. 2 and 3 consisting of a top 14 and a bottom 16. As is further illustrated in FIG. 2, there is an upper pair of arms 18 of the Scotch Yoke assembly and a lower pair of arms 20. There is a lower roller slot 22 in bottom 16 and an upper roller slot 24 in cap 14. A drive nut 26 is supported between arms 18 and 20 and is threadedly connected to a drive screw 28 which can be rotated by means of wheel 30 shown in FIG. 1. Drive nut 26 has an upper cylindrical extension 32 and a lower cylindrical extension 34 which extend respectively into upper roller slot 24 and lower roller slot 22. Mounted on upper cylindrical member 32 is a top roller 33 mounted within upper slot 24. There is a roller 36 mounted on lower cylindrical member 34 and it is in lower roller guide 22 which is in the bottom of the housing. Slots 22 and 24 receive the lateral force which is applied to the screw 28 when it is moving the yoke assembly through rotation of arms 18 and 20 by drive nut 26 as will be explained in connection with FIGS. 4 and 5. As shown in FIG. 3, upper arm 18 of the yoke assembly has arms 18A and 18B and the lower yoke arm likewise has arms 20A and 20B.

As the valve wheel 30 of FIG. 1 is rotated, it causes screw 28 as shown in FIGS. 2 and 3 to rotate. Inasmuch as drive nut 26 is threaded to screw 28, as screw 28 rotates, drive nut 26 is moved along in a straight line with the lateral forces being absorbed by the walls of the upper slot 24 and the walls of the lower slot 22 through rollers 33 and 36 respectively. The lateral force is in reality applied to the drive nut 26 and the reaction to this is through the rollers 33 and 36. There are two major problems concerned with this, one is that the screw 28 must accept a considerable amount of the lateral force. By lateral I mean the force that is perpendicular to the longitudinal axis of the screw 28. Another problem with the arrangement in FIGS. 2 and 3 is that the alignment of the slots 22 and 24 must be very precise in order to prevent the build-up of unwanted forces.

Figure 5:
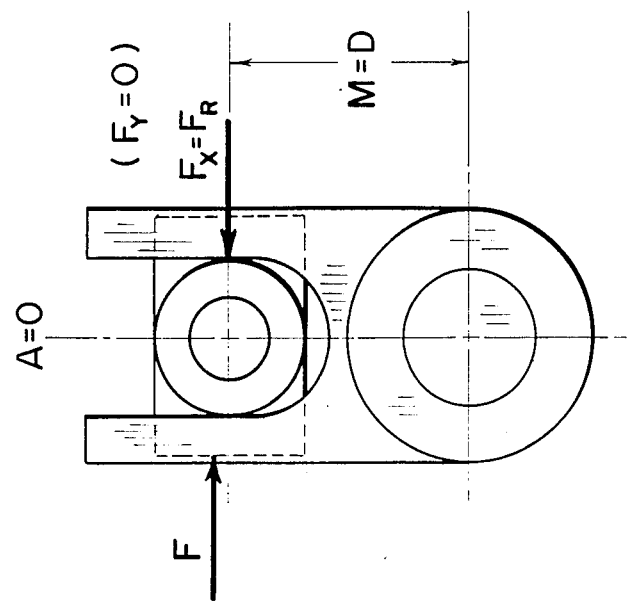
FIG. 5 is similar to that in FIG. 4 except that angle A equals 0.
Figure 4:
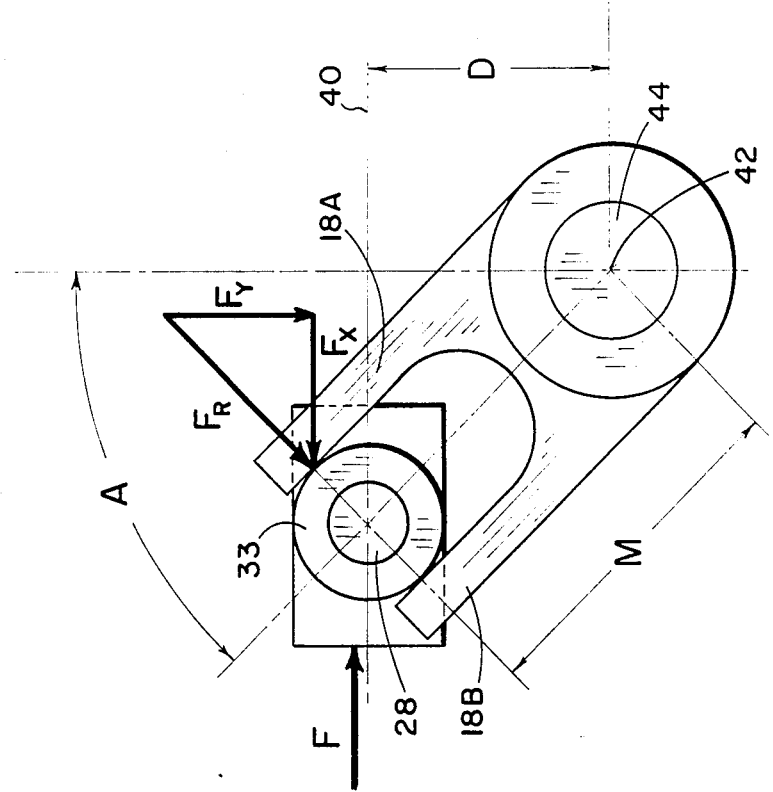
FIG. 4. illustrates the directional force of $F_R$ as a function of the force F and angle A.

Attention is next directed to FIG. 4 which shows the direction and magnitude of the force on roller 33 for example. The longitudinal axis of the screw 28 of FIG. 2 is along the center line 40 of FIG. 4 and the yoke assembly having arms 18A and 18B rotates about center 42 of the hub 44. Hub 44 is connected to a shaft extending externally of the housing to generate a rotary motion from the linear motion of the drive nut 26 caused by the rotating of the screws 28. The direction and magnitude of force $F_R$ is a function of the force F and angle A. Force F is generated by the rotation of drive screw 28 and $F_R$ is the reaction force on yoke arm 18A as it resists rotation about center 44. If friction is neglected, $F_R = F/\cos A$. The moment arm M of $F_R$ about the center of 42 of the hub is $M = D/\cos A$. The torque is $F_R \times M$ or $FD/\cos^2 A$. The number of degrees which arms 18A and 18B can rotate about center 42 is limited theoretically to a maximum of 180° of travel. However, from the expression given for M, it is evident that as A approaches 90°, the length M approaches infinity. This limits the angle A to some value less than 90°. Typically, the angle A varies from −45° to 45°. The graph in FIG. 5 shows that when $A = 0$, $F_Y = 0$. When $F_Y = 0$ there is no lateral force on screw 28, that is, of course, that force perpendicular to the longitudinal axis of the screw is 0. So, at this mid-point, there is no lateral force on the drive nut.

Figure 6:
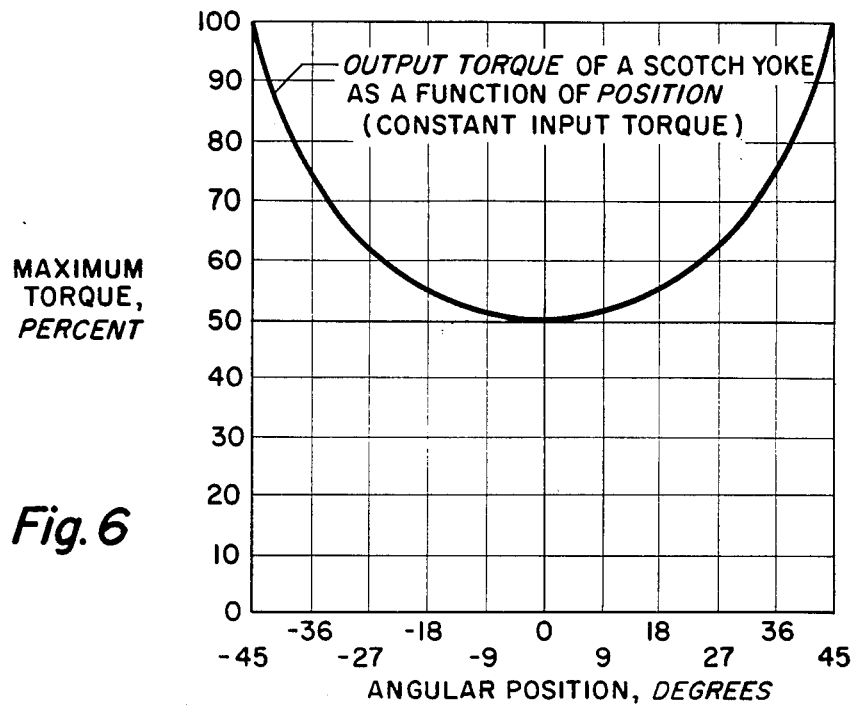
FIG. 6 is a graph showing the tort characteristics of a Scotch Yoke for various angular positions.

The graft in FIG. 6 shows the torque characteristics of a typical Scotch Yoke and assumes A varies from −45° to +45°. The actual output of a Scotch Yoke is less than predicted due to the effects of friction.

The mechanical advantage of a Scotch Yoke is a function of A. If the limits of travel of the drive nut are assumed to be 45° and −45°, then the mechanical advantage at either 45° or −45° is twice that at 0°. Note that the equation for the torque, $FD/\cos^2 A$ is FD at 0° and $FD \div 0.5$ at −45° and 45°.

Figure 7:
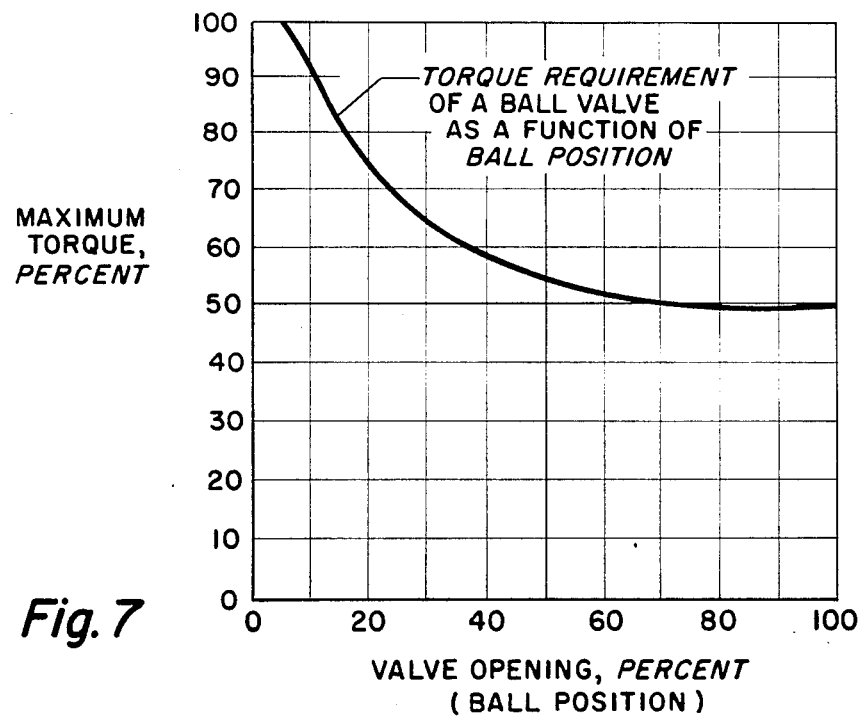
FIG. 7 is a graph showing the tort requirement of a ball valve as a function of ball position of a typical ball valve.

The side load on the drive nut 26 is given by $Y = F \tan A$. Y is greatest at the extreme values of A and least 0 when A is 0. As Y increases, the friction induced by Y also increases. The efficiency of a Scotch Yoke is greatest when Y is least and is at a minimum whey Y is largest due to the frictional forces caused by Y. FIG. 7 shows the torque requirement for valve movement of a typical ball valve for different valve openings.

This describes a Scotch Yoke and shows how it functions. This also points out that a disadvantage of the type support as shown in FIGS. 2 and 3 is the difficulty of maintaining precise alignment between the two spaced apart runways 24 and 22. Also, as pointed out briefly above, if there is a large distance between the roller 33 and roller 36, then the lateral force exerted on the drive nut must, in part, be transferred to the screw 28. There may also be deformation of screw 28 which can be detrimental.

Figure 9:
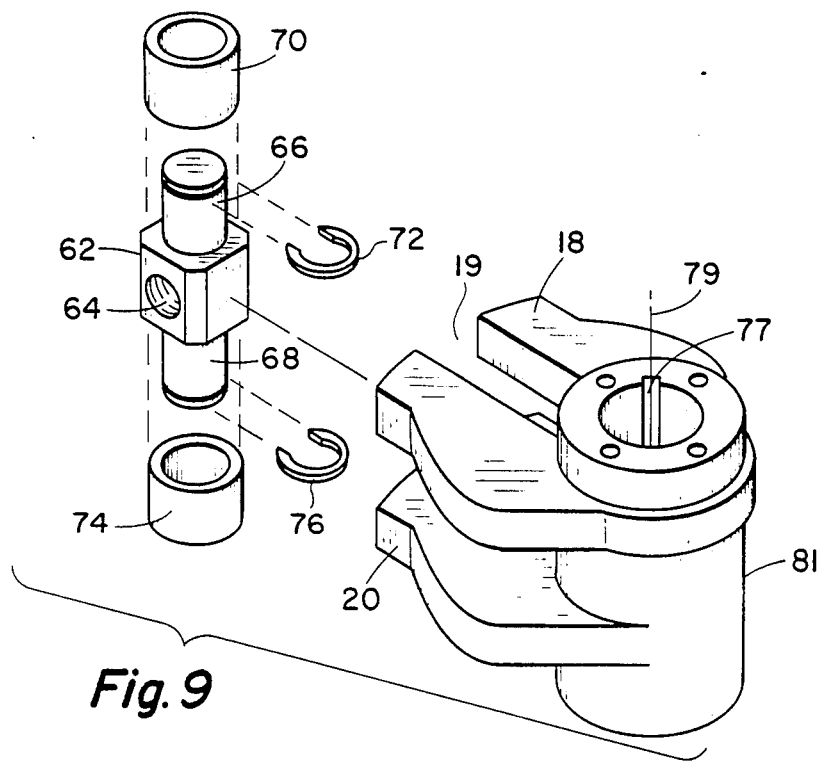
FIG. 9 illustrates an exploded view of the yoke assembly including the drive nut and rollers.
Figure 8:
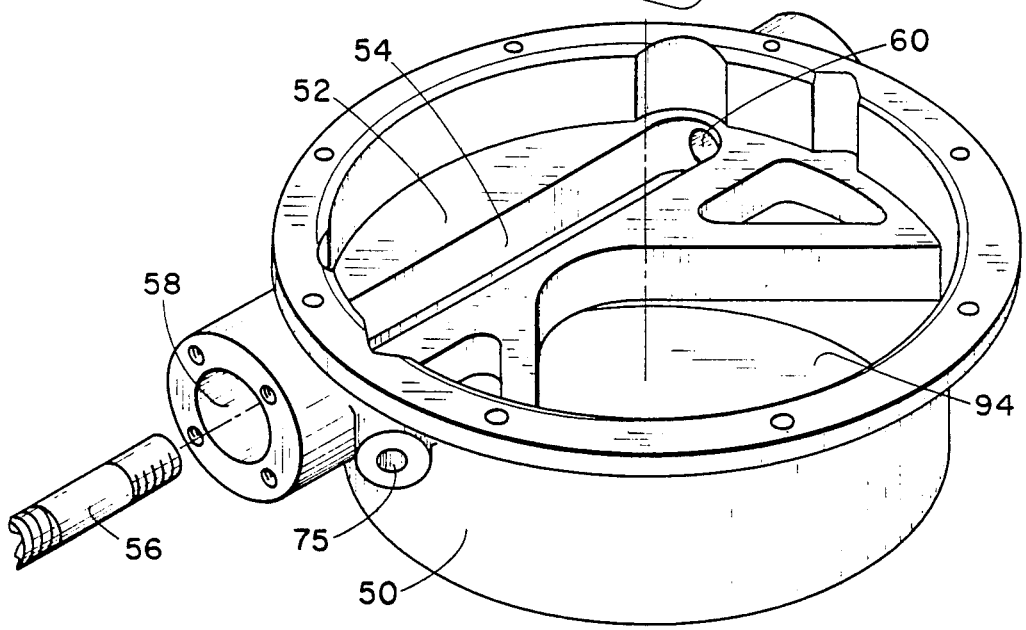
FIG. 8 is a view of the housing of this invention showing the rib slot which gives lateral support to the drive nut.
Figure 10:
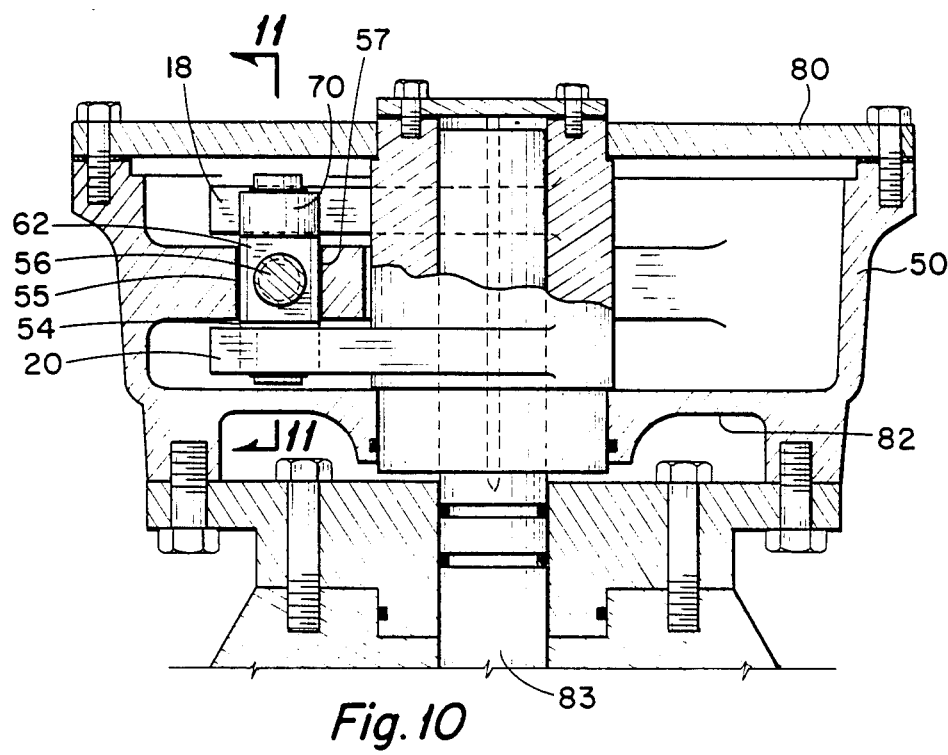
FIG. 10 is a cross-sectional view of my invention showing the yoke assembly with the drive nut positioned in the rib slot.

Attention is now directed to my improvement in the operator having the Scotch Yoke assembly whereby I eliminate the problems of the conventional assembly discussed above. I remove the problems of having to accurately machine the lower and upper slots 22 and 24 which are in the housing proper. I replace those two slots with a single slot. I also provide a system where the guide screw 28 does not have to carry side loads. Attention is directed to FIG. 8 showing the modification of the housing which I have provided. Shown therein, is a housing 50 with top and bottom removed and showing a rib 52 therein. Rib 50 has a rib slot 54 which, as will be seen when it is assembled, is between the upper and lower arms 18 and 20 as shown in FIG. 10. Rib slot 54 is aligned with drive screw 56 which enters through opening 58. Screw 56 extends through the other end of rib slot 54 through hole 60. Rib 52 can be cast without the rib slot 54 and then rib slot 54 can be machined. It is noted that there is only one slot to machine in this arrangement so there is no problem about alignment with a second slot. I also do away with the upper and lower rollers 33 and 36 as shown in FIG. 2. As shown in FIG. 9, I have a drive nut 62 having internal threads 64 through which screw 56 rotates. The drive nut also has an upper cylindrical member 66 and a lower cylindrical member 68. An upper roller 70 is held in position over the nut of the cylindrical extension 66 by snap ring 72, likewise, the lower roller 74 can be held in position on cylindrical extension 68 by snap ring 76. Opening 75 can also be provided in housing 50 as shown in FIG. 8 so that serts or other type fittings can be attached thereto so that grease can be applied to the internal part of the housing.

Figure 11:
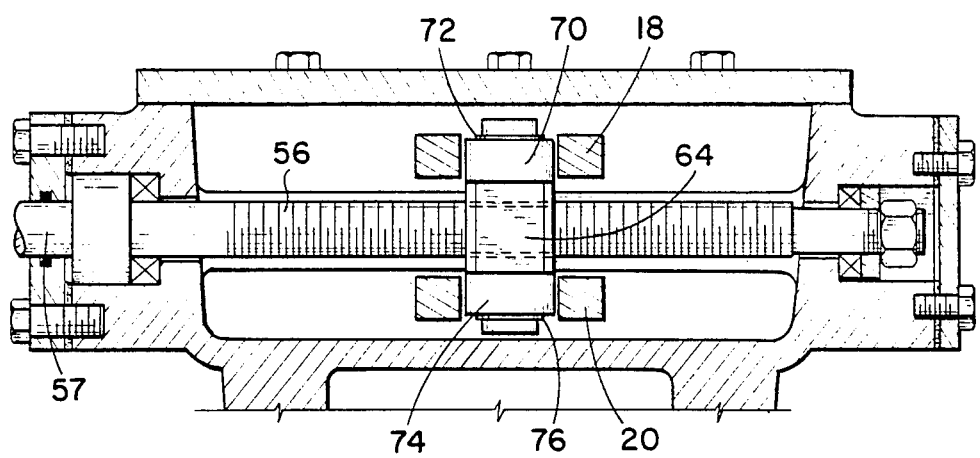
FIG. 11 is a view taken along the line 11—11 of FIG. 10.

Attention is now directed to FIGS. 10 and 11 which shows the housing 50 previously shown in FIG. 8, as having a top 80 and a lower end or bottom 82. The improved Scotch Yoke assembly has been inserted into the housing. As shown in FIG. 10, the drive nut 54 mounted on drive screw 56 is mounted within rib slot 54. The rollers 70 and 74 are in contact with the arms 18 and 20. The drive nut 62 is in contact with the walls 55 and 57 of the rib slot 54. With this system, the screw 56 cannot be bent by lateral force because the rib slot wall holds the drive nut in position.

It is believed apparent that there are many advantages to the rib slot support system which I have described herein. There is no misalignment problem between top and bottom slots of the housing in the convention system because I have only one slot in my system. It is a further advantage to have to machine only one slot instead of two. The rib onto which the slot is cut is an intergral part of the housing and the rib itself is quite stiff. The screw 56 does not carry any side or lateral loads.

Figure 12:
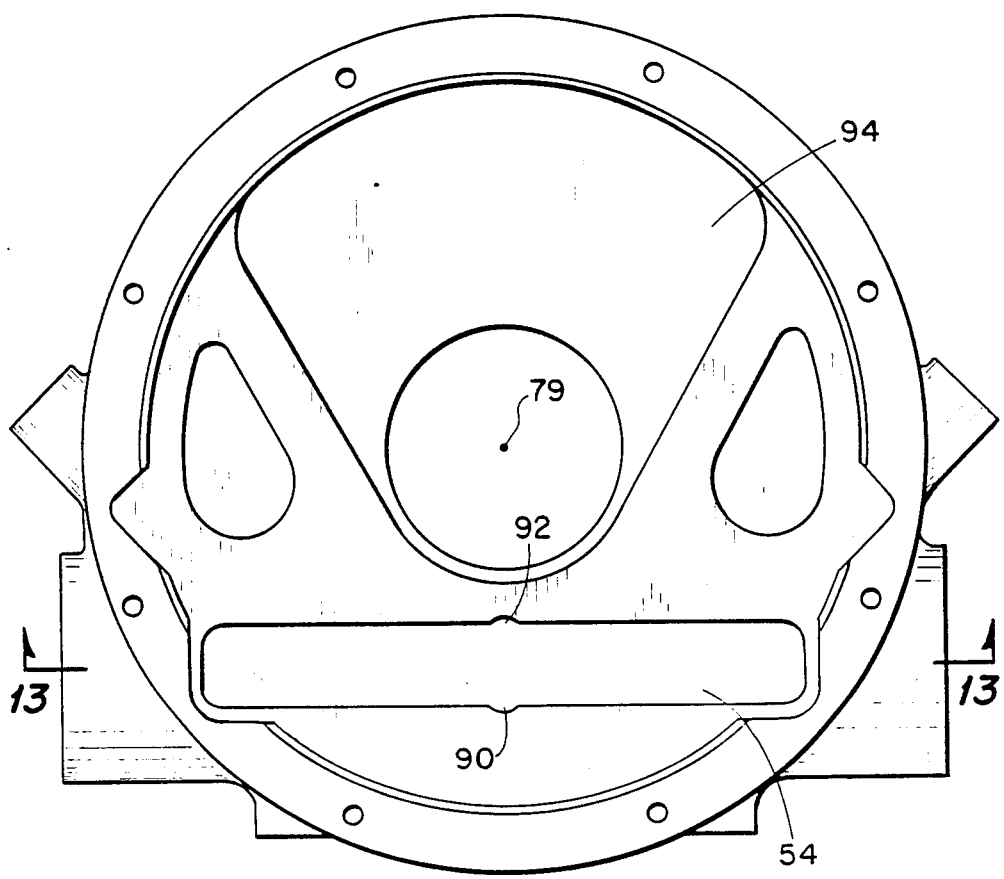
FIG. 12 is a top view of the housing of the operator showing a modification of the rib slot of my invention.

In the device of FIG. 10, the shaft 83 is inserted into the hub 81 of the yoke assembly as shown in FIG. 9 and is prevented from rotating by placing a locking pin in slot 77. Shaft 83 extends out the lower end of the housing and can be used to rotate a ball valve such as is shown in FIG. 1. Also, in FIG. 11, screw 56 has extension 57 which may be attached to a hand wheel or other drive mechanism. To assemble this device, the yoke assembly proper shown in FIG. 9 including the arms 18 and 20 and hub 81 are lowered through opening 94 as shown in FIGS. 8 and 12 with the center of the yoke 79 at the center of the housing. After the yoke is lowered down to the proper position so that the upper arms are above rib 52 and the lower arms are below it. The drive screw 56 and its associated drive nut 64 and rollers 70 and 74 are then assembled in rib slot 54 with drive nut 62 in the position shown in FIG. 10. The yoke assembly is then manipulated and rotated so that the upper slot 19 of arm 18 and the corresponding lower lost of the lower arms 20 is positioned about rollers 70 and 74 as shown in FIG. 11.

Figure 13:
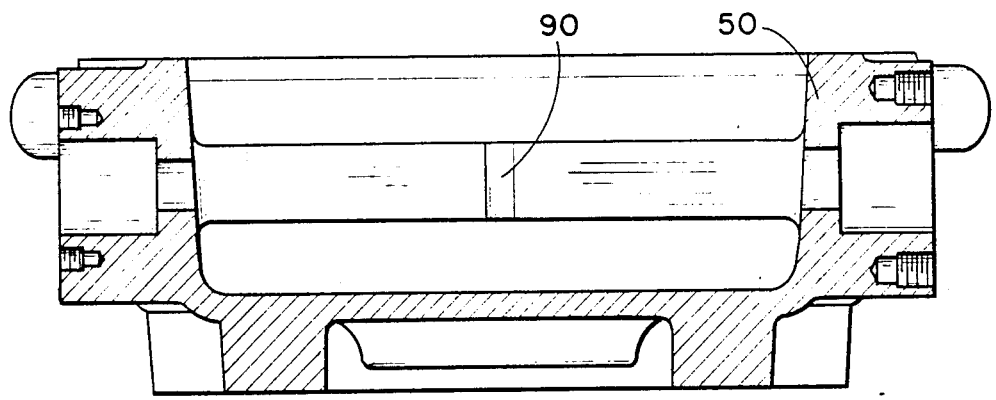
FIG. 13 is a view taken along the line 13—13 of FIG. 12.

Attention is now directed to FIGS. 12 and 13 which show a slight modification of my invention. The rib slot 54 is provided with a pair of "dimples" 90 and 92. The purpose of this is to ease assembly and disassembly. As explained above, when the drive nut 64 is in the center position where angle A=0, there is no side force. Therefore, I can make the dimples 90 and 92 as shown in FIG. 12 without having to worry about how the side force is transferred, because there is none. The reason that these dimples have importance is that sometimes the roller 74 might become slightly deformed and have trouble extracting it. However, the dimples 90 and 92 would permit easy removal because the rollers would probably be only slightly deformed.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for converting linear motion to rotary motion comprising:
    a housing generally circular in shape and having a top and a bottom;
    a rib in said housing, said rib having a single elongated rib slot therein with opposite walls;
    yoke assembly having a hub and an upper pair of arms and a lower pair of arms extending outwardly from said hub;
    a drive screw having two ends and extending through said rib slot, each said end being supported by said housing;
    a drive nut on said screw and positioned in said rib slot, said drive nut having an upper and a lower roller, said upper roller positioned in a slot between said upper pair of arms and said lower roller positioned in a slot between the said lower arms;
    said drive nut being in sliding contact with the walls of said rib slot such that said rib resists any lateral force on said drive screw generated by the force between the yoke assembly and the drive nut.

2. An apparatus as defined in claim 1 in which said rib slot contains dimples on either side at approximately half way between the ends of said rib slot.

3. An apparatus as defined in claim 1 in which said rib has a v-shaped opening larger in areal extend than the areal extend of said hub and said lower pair of arms.

4. An apparatus as defined in claim 3 in which said hub is provided with a rod extending externally of the housing for driving an external device.

5. An apparatus as defined in claim 1 in which said upper roller has a diameter equal to the width of said slot between said upper pair of arms.

6. An apparatus for converting linear motion to rotary motion comprising:
    a housing;
    a rib in said housing, said rib having a single long rig slot therein;
    a drive screw having two ends and extending through said rib slot, each said end supported by said housing;
    a drive nut on said screw and positioned in said rib slot and movable along said rib slot by rotating said drive screw and adapted to transfer lateral loading on said drive screw to a wall of said rib slot;
    an integral yoke assembly which consists only of a hub and an upper pair of arms and a lower pair of arms extending outwardly from said hub, and upper and lower rollers supported from said drive nut, said upper rollers positioned in a slot between said upper arms and said lower roller in a slot between said lower arms;
    means for rotating said hub in response to movement of said drive nut along said drive screw.

7. An apparatus as defined in claim 6 in which said rib slot has indentations on its inner walls at a point intermediate the ends thereof.

8. An apparatus as defined in claim 7 including means to insert grease in said rib slot.

9. An apparatus for converting linear motion to rotary motion comprising:
    a housing;
    a rib in the interior of said housing and integral therewith, said rib having a single long rib slot therein, said slot having opposite and essentially parallel planar walls facing each other, said rib slot has indentations on its inner walls at a point intermediate the ends thereof;
    a drive screw extending through said rib slot, said screw having an axis essentially parallel to the plane surfaces of said walls of said slot;
    a drive nut on said screw and positioned in said rib slot and moveable along said rib slot by rotating said drive screw and adapted to transfer lateral loading on said drive screw to a wall of said rib slot;
    means for rotating said hub in response to movement of said drive nut along said drive screw including a yoke assembly having a hub, an upper pair of arms and a lower pair of arms extending outwardly from said hub and upper and lower rollers supported from said drive nut, said upper roller positioned in the slot between said upper arms and said lower roller in the slot between said lower arms.

10. An apparatus as defined in claim 7 including means to insert grease in said rib slot.

* * * * *